Dec. 28, 1943.  G. P. KIMMEL  2,337,560
OPHTHALMIC MOUNTING
Filed March 4, 1940
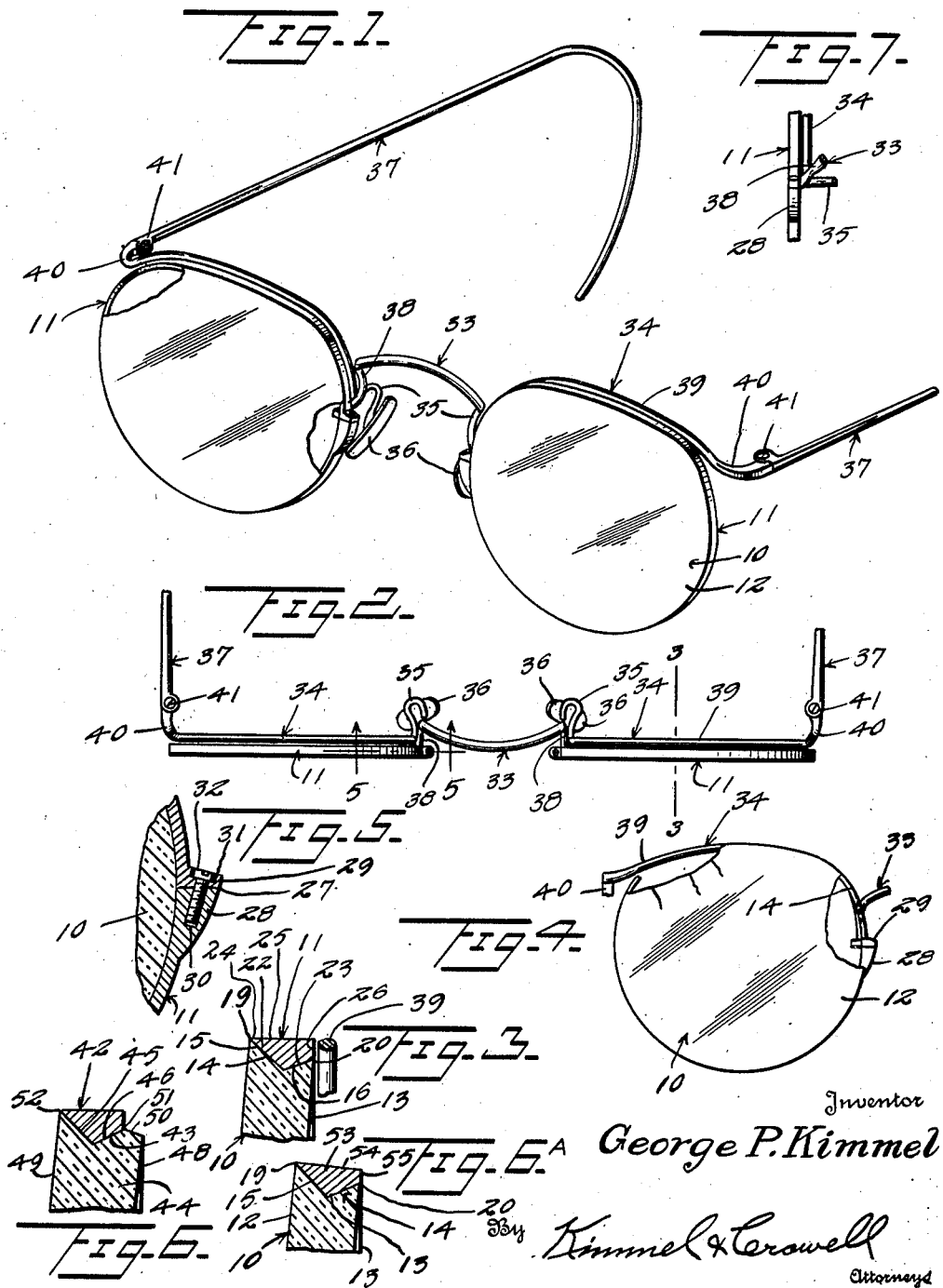
Inventor
George P. Kimmel
By Kimmel & Crowell
Attorneys Patented Dec. 28, 1943

2,337,560

UNITED STATES PATENT OFFICE 2,337,560

OPHTHALMIC MOUNTING

George P. Kimmel, Brookeville, Md., assignor to The Ful-Vue Sales Company, Providence, R. I.

Application March 4, 1940, Serial No. 322,219

6 Claims. (Cl. 88—41)

This invention relates to ophthalmic mountings and more particularly to a mounting for a pair of spectacles of a type known in the trade as Numont Ful-Vue and Arcway Ful-Vue, wherein the temple connecting member for joining the temple with the spectacles is mounted at one end at the nasal sides of the bridge member of a pair of spectacles.

The invention forming the subject matter of this application is a continuation-in-part of my copending application Serial No. 301,242, filed October 25, 1939, now Patent 2,284,524, issued May 26, 1942.

My invention comprises the combination with the aforesaid type of spectacle supporting and temple attaching means, of a means encircling the lenses for the retention thereof which is inconspicuous and substantially invisible from view at the front of the spectacles but which provides, nevertheless, all the strength and rigidity of metallic rim type spectacles of the ordinary character.

Another object of my invention is to provide a pair of spectacles of the type described in which the eyewire is of such configuratin in cross section that it will register with the edge of a lens grooved circumferentially to receive the same, the inner circumference of the eyewire will register with the groove in the lens edge and the outer periphery of the eyewire when assembled with the lens will be substantially flush with the greatest diameter of the lens.

Another object of my invention is to provide a spectacle mounting of all metal, as distinguished from combination zylonite and metal, wherein the lens rim or eyewire encircling the lenses will be so inconspicuous as to give the general appearance of eyeglasses but without the weakness inherent in the customary method of drilling for attaching the bridge member in constructing a pair of eyeglasses of the so-called rimless type.

Another object of my invention is to eliminate the weakness inherent in a pair of the Numont or Arcway type of mountings wherein the rimless lens strap method of attachment is used as has heretofore been manufactured and as is shown in such patents illustrative of this type of mounting identified by U. S. Patents Nos. 2,050,525; 2,108,875; and 2,188,380.

A further object of the invention is to provide, in a manner as hereinafter set forth, an ophthalmic mounting which is simple in its construction and arrangement, strong, durable, compact, distinctive in appearance, thoroughly efficient in its use, readily installed with respect to a pair of lenses and comparatively inexpensive to manufacture.

Embodying the objects aforesaid and others which may hereinafter appear, the invention consists of the novel construction, combination and arrangement of parts as will be more specifically described and illustrated in the accompanying drawing, wherein are shown embodiments of the invention, but it is to be understood that changes, variations and modifications may be resorted to which fall within the scope of the invention as claimed.

In the drawing:

Figure 1 is a perspective view, partly broken away of an ophthalmic mounting in accordance with my invention, Figure 2 is a top plan with the temples broken away, Figure 3 is a fragmentary view in section on line 3—3 Figure 2, Figure 4 is a detail front elevation, partly broken away of the mounting, Figure 5 is a fragmentary sectional view, upon an enlarged scale on line 5—5 Figure 2, Figure 6 is a fragmentary sectional view of a modified form, Figure 6ª is a view similar to Figure 6 of still another modified form, and Figure 7 is a fragmentary detail in elevation looking towards the inner side of an eyewire.

With reference to Figures 1 to 5 and 7 of the drawing. A pair of lenses are shown by Figure 1 and each is generally indicated at 10. Each lens 10 is mounted in and supported by a metallic eyewire or rim generally designated 11 having its body preferably of less thickness than the metallic eyewires or rims now in general use. Each eyewire will conform substantially in contour to the contour of its correlated lens. Each lens may be provided with a suitable marginal configuration and between the front and rear faces 12, 13 respectively thereof, the marginal edge of the lens is formed with an endless groove, generally indicated at 14 and clearly shown in Figures 3 and 6ª. The groove 14 is formed by grinding or cutting in the foresaid edge in a known manner. The groove 14 in transverse cross section is substantially of V-form and includes oppositely disposed front and rear inclined walls 15, 16. The wall 15 inclines downwardly and rearwardly with respect to the front face 12 of a lens and the wall 16 inclines downwardly and forwardly with respect to the rear face of the lens. The wall 15 in transverse cross section is relatively longer than the wall 16 in transverse cross section. The inclination of the wall 15 is greater than the inclination of the wall 16. The outer terminus of the wall 15 merges into the front face 12 of a lens. The outer terminus of the wall 16 merges into the rear face 13 of the lens except where the margin of the lens is thicker as shown in Figure 6. The outer terminus of the wall 15 of the groove 14 forms the lens with a sharp front edge 19 and the outer terminus of the wall 16 of the groove 14 forms the lens with a relatively sharp rear edge 20. The form and position of the grooves 14 are such as to provide for the dimension or diameter of the rear face 13 of the lens being less than the dimension or diameter of the front face of the lens, whereby the rear sharp edge 20 will be inset relatively to the front sharp edge 19. The angle of the front wall 15 of the groove 14, with respect to the rear face 13 of the lens, is less than the angle of the rear wall 16 of the groove 14, with respect to the front face 12 of the lens.

An eyewire 11 engages in the groove 14 of and encompasses a lens. The eyewire is of a configuration in transverse section such as to register with the groove, and is provided with groove engaging faces 22 and 23 which are inclined relative to each other at substantially the same angle as the inclination of the walls 15 and 16 of the groove 14, so that the eyewire or rim 11 will snugly seat in the groove 14. The forward edge 24 of the eyewire 11 is substantially flush with the sharp edge 19 and the upper face 25 of the eyewire 11 extends rearwardly in substantially a horizontal plane so that when the rim or eyewire 11 is seated in the groove 14 the eyewire 11 will be substantially invisible from the front of the lens. The eyewire 11 is provided with a rear face 26 disposed at substantially right angles to the outer face 25.

Each eyewire is split on the nasal side thereof as indicated at 27, Figure 5. One of the terminal portions of the split eyewire is laterally enlarged, as at 28, and its other terminal portion formed with a laterally extending flange 29, which seats upon the upper end of such enlargement. The latter is formed with a threaded socket 30. The flange 29 is provided with a countersunk opening 31. Extending through the opening 31 and threadedly engaging with the wall of the socket 30 is a headed countersunk securing device 32 for maintaining the split ends of the eyewire in abutting relation and the eyewire in encompassing relation with respect to a lens whereby the latter is secured to the eyewire.

The mounting includes a bridge 33, a pair of oppositely extending horizontally disposed supporting bars 34 of arcuate form, a pair of oppositely disposed nose-pad carrying arms 35, nose pads 36 on the arms 35 and a pair of temples 37 pivoted to the bars 34. There is correlated with said eyewire a supporting bar 34, a nose pad carrying arm 35, a nose pad 36 and a temple 37. The bridge 33 is formed with end depending portions 38 which are integrally connected with the rear faces of the eyewires on the upper part of the nasal sides of the eyewires. The upper end of an arm 35 merges into an end portion 38 of the bridge 33. The inner end of a supporting bar 34 merges into an end portion 38 of the bridge 33. The manner of setting up the bridge 33 with respect to the eyewires and the bars 34 and arms 35 relative to the bridge forms an integral unit to which the temples 37 are hinged and by which the lenses are supported.

Each bar 34 has the major portion of its length arranged rearwardly of the upper portion of and is concealed by an eyewire. Although the bars 34 have been referred to as of arcuate contour, yet it is to be understood that the bars will conform in contour to the contour of the upper portion of an eyewire. The bars 34 are of like form and as shown each consists of an elongated inner portion 39 of arcuate form merging at its outer end into a curved rearwardly directed outer portion 40 constituting what may be termed a temple end piece and to which the outer end of a temple 37 is pivotally connected as at 41.

In Figure 6 there is disclosed an eyewire 42 which is similar in every detail to the eyewire 11, being of irregular configuration in transverse section. The obtusely related sides of the eyewire 42 are adapted to snugly engage in a V-shaped groove 43 which is formed in the marginal edge of the lens 44. In the present instance the eyewire 42 is relatively narrower in width than the thickness of the lens 44. The rear face or small side of the eyewire 42 is positioned forwardly of the rear face 48 of a lens 44. Due to the fact that the eyewire 42 is of a width such that the long side thereof will not extend from the front face 49 to the rear face 48 of the lens 44, thus leaving a bevelled edge portion 50 extending rearwardly from the short side or rear face 51 of the eyewire 42, it will be apparent that the eyewires 42 may be made of a size for use with lenses of normal thickness but that with lenses of greater thickness than the width of the eyewire, the eyewire can, nevertheless, be snugly engaged with the lens and when mounted on the lens will be substantially invisible from the front thereof.

In Figure 6ᵃ there is disclosed an eyewire 53 somewhat similar to the other eyewires, but with this exception that the eyewire 53 has the outer side 54 thereof disposed at an acute angle relative to the plane of the forward face 12 of the lens 10. The rear face or short side 55 of eyewire 53 projects outwardly of the groove 14 a sufficient distance so that the bridge, nose pads and temple supporting bars may be attached thereto.

By inclining the outer side 54 of the eyewire at an acute angle relative to the plane of the forward face of the lens, as shown in Figure 6ᵃ the eyewire is more completely concealed when viewed from the front.

The primary purpose of this invention as will be noted from the foregoing description is to provide very substantially constructed spectacles but one which will have a novel appeal at the same time by reason of its extreme inconspicuousness.

What I claim is:

1. In spectacles, a pair of grooved lenses, an eyewire encompassing, secured with and extended into the groove of a lens, a bridge having depending portions merging at their lower ends into the upper part of the rear surfaces of the eyewires at the nasal sides of such wires, depending nose pad carrying arms each merging at one end into a portion of the bridge, nose pads carried by each of said arms, a pair of spaced, oppositely disposed supporting bars each common to the bridge and a temple and corresponding substantially in contour for the major portion of its length to the contour of the upper part of a lens, said bars merging at their inner ends into portions of the bridge and arranged at the rear of said upper parts of the lenses, and a temple connected to the outer end of each bar, the walls of the grooves in said lenses being of different heights with the front wall of a groove of greater height than the rear wall, and the said eyewires of a complementary cross section to said grooves, having a horizontal upper surface that is flush with the edge of the front surface of a lens and a rear surface that extends above the rear edge of and is substantially flush with the rear surface of the lens.

2. In spectacles, a pair of lenses each having an endless groove on its edge, lens wires seated in said grooves and secured to the lenses, the walls of the grooves in said lenses being of different heights with the front wall of a groove of greater height than the rear wall, and the said eyewires of a complementary cross section to said grooves, having a horizontal upper surface that is flush with the edge of the front surface of a lens and a rear surface that extends above the rear edge of and is substantially flush with the rear surface of the lens, a bridge merging into the eyewires on the nasal sides of such wires, a pair of spaced, oppositely disposed horizontal supporting bars having the major portion of their length conforming substantially in contour to the outline of the upper parts of said wires, said bars merging at their inner ends into said bridge, arranged rearwardly of the upper parts of the said wires and each common to the bridge, and a temple, and temples connected to the outer ends of said bars.

3. In spectacles, a pair of lenses each having its edge provided with an endless groove formed with front and rear walls disposed at opposite inclinations, the rear wall being of less height than the front wall, a pair of metallic eyewires each split on the nasal side thereof, each of said wires encompassing a lens and having a portion thereof seating in and conforming in contour to the contour of a groove, each of said wires having its outer surface substantially flush with the front surface of a lens, means engaging in each wire and extending across the split in the latter for securing the wire about a lens, a bridge piece disposed between the lenses and having depending end portions merging at their lower ends into the rear faces of the wires on the nasal sides of the latter, nose pad arms merging at their upper ends into said depending portions, nose pads on the lower ends of said arms, and oppositely disposed spaced supporting bars common to the bridge and to temples, conforming substantially in contour to the contour of the upper parts of the lenses, arranged rearwardly of said upper parts, merging at their inner ends into said depending portions and having rearwardly directed outer terminal portions, and temples connected to said rearwardly directed portions, the rear surfaces of said wires being extended laterally from the rear faces of said lenses.

4. In spectacles, a pair of grooved edge lenses, eyewires encircling said lenses, a nose bridge, a pair of nose pad arms, nose pads carried by said arms, and a pair of supporting bars, said supporting bars each shaped to substantially conform in contour for the major portion of its length to the contour of the upper part of a lens and terminating in a rearwardly directed curved portion constituting an endpiece for the attachment of a temple and each bar attached at its other end to an adjacent end portion of the said bridge, said lenses each having the front wall of the groove of greater height than the rear wall, and said eyewires each of complementary cross section to a groove, each having a horizontal upper surface substantially flush with the edge of a front surface of a said lens, and each having a rear surface that extends above the rear edge of a lens and is substantially flush with the rear surface of the lens.

5. In spectacles, a pair of circumferentially grooved lenses in which the walls of the grooves are of different heights with the front wall being of greater height than the rear wall, a pair of eyewires, a bridge connecting said eyewires and a pair of supporting bars, the said bars conforming substantially in contour to the contour of the upper portions of said eyewires and positioned rearwardly thereof, the said bars being each connected at one end with an end portion of the said bridge and each terminating at the other end in an endpiece for the attachment of a temple bar, the said eyewires of a cross section complementary to the said grooves and having a horizontal upper surface that is flush with the edge of a front surface of a lens and a rear surface that extends above the rear edge of and is substantially flush with the rear surface of a said lens.

6. In spectacles of the type having eyewires, a connecting bridge and supporting bars extending rearwardly of the eyewires and following the upper contour thereof, with temple connections at the outer ends of the bars, the bars being connected with the nasal sides of the bridge, a pair of circumferentially grooved lenses in which the walls of the grooves are of different heights with the front wall of greater height than the rear wall, the said eyewires being complementary in cross section to the said lens grooves, the wires having upper horizontal surfaces flush with the edge of the front surface of a lens and a rear surface extending substantially above the rear edge of and substantially flush with the rear surface of a said lens.

GEORGE P. KIMMEL.